United States Patent [19]
Piltingsrud et al.

[11] Patent Number: 6,068,905
[45] Date of Patent: May 30, 2000

[54] COMPOSITE DISK SUBSTRATES

[75] Inventors: Douglas Howard Piltingsrud; Steven Francis Starcke, both of Rochester, Minn.

[73] Assignee: International Business Machines Corporation, Armonk, N.Y.

[21] Appl. No.: 08/915,227

[22] Filed: Aug. 20, 1997

[51] Int. Cl.[7] .................................................. G11B 5/73
[52] U.S. Cl. .................. 428/64.1; 428/64.2; 428/64.3; 428/65.3; 428/65.6; 428/694 ST; 360/135
[58] Field of Search ................... 428/64.1, 64.2, 428/64.3, 65.3, 65.6, 694 ST; 360/135

[56] References Cited

U.S. PATENT DOCUMENTS

| | | | |
|---|---|---|---|
| 2,763,569 | 9/1956 | Bradstreet et al. | 117/47 |
| 3,850,665 | 11/1974 | Plumat et al. | 117/33.3 |
| 4,397,671 | 8/1983 | Vong | 65/60.52 |
| 5,043,182 | 8/1991 | Schultze et al. | 427/34 |
| 5,118,539 | 6/1992 | Sebby et al. | 428/15 |
| 5,487,931 | 1/1996 | Annacone et al. | 428/64.1 |
| 5,626,943 | 5/1997 | Tenhover | 428/141 |
| 5,712,014 | 1/1998 | Carden | 428/65.6 |
| 5,820,965 | 10/1998 | Pyzik et al. | 428/65.6 |

*Primary Examiner*—Stevan A. Resan
*Attorney, Agent, or Firm*—John J. Gresens; Mark A. Hollingsworth

[57] ABSTRACT

A disk substrate fabricated front an inner substrate having a specific stiffness greater than about 7.6 Mpsi/gm/cc and an encapsulating layer deposited over the inner substrate. The inner substrate may include materials such as alumina, silicon carbide, beryllium, boron carbide, aluminum, and mixtures thereof. The encapsulating layer may be made from aluminum, magnesium, copper, zinc, and mixtures thereof. The disk substrate may additionally comprise a finishing layer deposited on the encapsulating layer fabricate from a material such as nickel or an alloy thereof. The invention also comprises use of the disk substrate in a data storage and retrieval device and a method of fabricating a disk

21 Claims, 3 Drawing Sheets

COMPOSITE DISK SUBSTRATES

FIELD OF THE INVENTION

The invention relates generally to disk substrates for hard disk drives. More specifically, the invention relates to disks fabricated from composite materials to provide a stiff substrate, less susceptible to environmental forces which otherwise may create disk flutter.

BACKGROUND OF THE INVENTION

In the computer industry, hard disk data storage elements or memory are generally made from aluminum or an aluminum alloy. Through a variety of processes, the aluminum is treated or otherwise coated and passivated so that it may act as a repository for information which is electronically written onto the disk. To ensure efficient and accurate data processing, hard disk components should be smooth or have an ability to be super finished to near atomic smoothness.

Hard disk memory components have certain properties or characteristics which make them commercially valuable products. One important parameter of concern for hard disk drives is increased processing speed. To increase processing speed, various drive design criteria have been modified. For example, the fly height of the disk head has been reduced, reducing the travel distance between the head and the disk. In turn, this gives higher bit density which reduces the processing time.

However, reducing fly height dictates that disk smoothness must increase as a matter of necessity. Hard drive disks preferably should have an ability to be polished to a high smoothness and to resist defects from operation such as holes, pits, digs, and scratches or mounds.

Another way to increase processing speed is to increase the speed at which disks rotate. However, higher disk spin rates (10,000 rpm or greater) can produce disk flutter or vibration as the disk works through operations of stopping, starting, varying speed and effecting actuator travel. Even at constant speed, disk flutter may result from turbulent air flow within the disk compartment or harmonic vibrations from the motor. Airflow is generally regarded as the primary cause of disk vibration.

The conventional material used in this fabrication has traditionally been aluminum or an aluminum magnesium alloy. Coating this alloy with a nickel plate provides a hard exterior surface which allows the disk to be polished and super finished. This type of disk is more easily finished. However, the relative flexibility of the alloys makes this type of disk more susceptible to environmental forces which create disk flutter and vibration.

One alternative to aluminum substrates for hard disks is the use of composite materials. However, these materials are not the easiest to finish. Previously, some attempts have been made to use materials which have properties of higher stiffness and smoothness.

For example, Japanese patent 4280817 discloses method for forming a thin zirconia film on a glass substrate. Zirconium n-propoxide, acetic acid and water are reacted to form a zirconia precipitate precursor gel, mixed with acetic acid and n-butanol, heated to 60° C., coated and sintered onto the glass. The coated glass is thermally treated at 500° C. to form cubic zirconia.

Vong, U.S. Pat. No. 4,397,671, discloses a method for forming a metal oxide film on the surface of a heated glass substrate by forming a powder from an organic based metal salt which is heat decomposable, such as metal acetyl acetonates.

Plumat et al., U.S. Pat. No. 3,850,665, disclose forming a metal oxide coating on a vitreous or nonvitreous substrate by applying to the substrate a composition comprising an acetyl acetonate coprecipitate of two or more metals. The substrate and composition are simultaneously or subsequently heated to convert the coprecipitate to a metal oxide coating.

Klinedinst, U.S. Pat. No. 5,118,539, discloses a method for coating titanium dioxide onto surfaces such as those comprising zinc sulfide or phosphorous to provide for any number of enhanced properties including chemical resistance to absorbency, as well as the filtering or reflection of electromagnetic radiation.

Further, Schultze et al., U.S. Pat. No. 5,043,182, discloses a method for producing ceramic metal composite materials through the application of ceramics onto a substrate. Subsequently, molten metal is infiltrated into the pores of the ceramic material. Bradstreet et al., U.S. Pat. No. 2,763,559, discloses a coating method for use in the application of refractory metal oxide films onto metal parts which are subjected to high temperature.

Composites provide disks of superior hardness and stiffness when compared to aluminum disks. However, composites are often difficult to coat and super finish. Specifically, composites are difficult to polish without giving rise to other physical defects during the polishing cycle. Because of hardness of certain composites, finishing cycles are very long and the disks begin to adopt certain characteristics which are undesirable such as edge roll off.

As a result, there is a need for disks of superior stiffness and hardness which resist defects, provide a smooth substrate surface, (to atomic smoothness), are relatively thin, and have low mass.

SUMMARY OF THE INVENTION

In accordance with a first aspect of the invention, there is provided a disk substrate comprising an inner substrate having a specific stiffness greater than about 7.6 Mpsi/gm/cc. The disk substrate also comprises an encapsulating layer deposited over said inner substrate.

In accordance with a second aspect of the invention, there is provided a data storage and retrieval device. The device comprises a disk substrate having an inner substrate having a stiffness greater than about 7.6 Mpsi/gm/cc and an encapsulating layer deposited over the inner substrate.

We have found that disks with greater dynamic dimensional stability can be provided by encapsulating an inner stiff composite substrate with a thin bonded layer. The resulting disk is a substrates which may be easily edged, lapped flat, and polished smooth using industry standard processes. This invention provides disks having the desired stiffness and allows selection of a bonded outer layer with the desired finishing properties. In the context of this invention stiffness means specific stiffness measured as Mpsi/g/cc.

DETAILED DESCRIPTION OF THE PREFERRED EMBODIMENT

Figure 1:
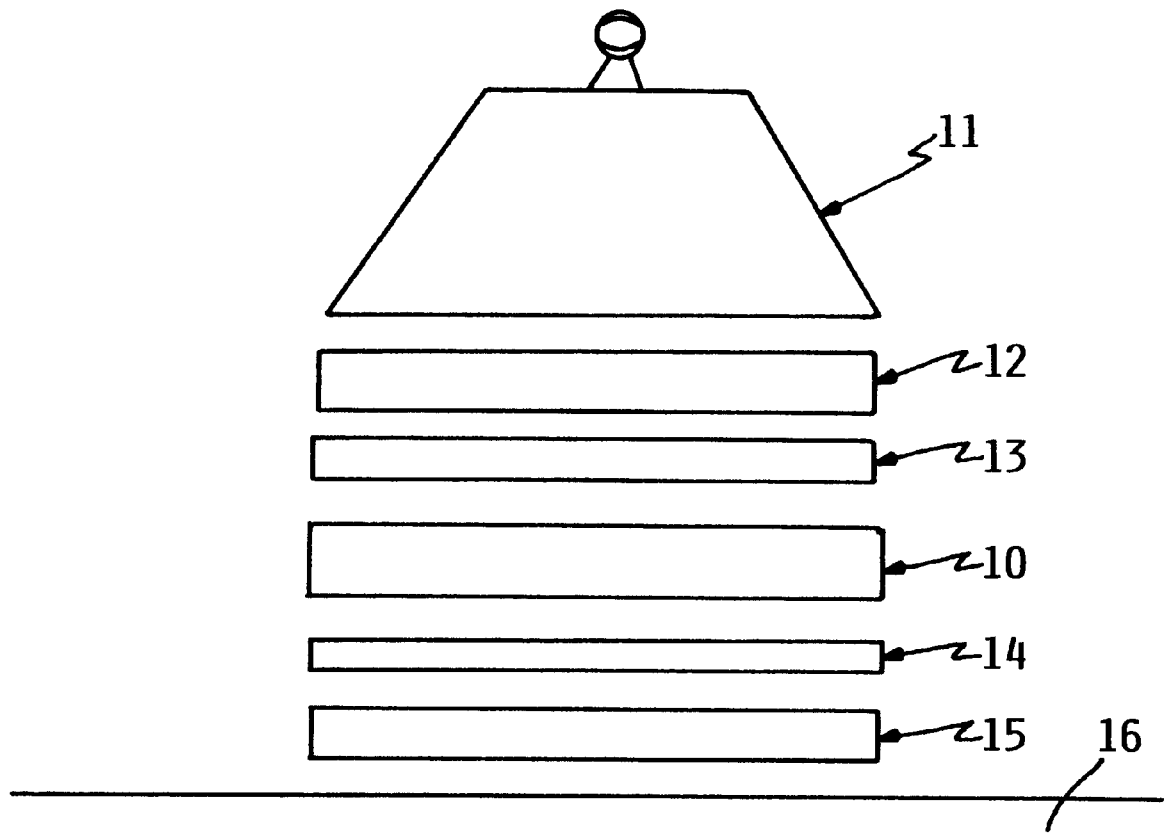
FIG. 1 is an exploded side elevational view of one step of disk processing according to one aspect of the invention.

The invention includes a composite disk substrate and methods for fabricating the same. The disk substrate generally includes an inner substrate having a specific stiffness greater than about 7.6 Mpsi/gm/cc and an encapsulating layer deposited over the inner substrate. The disk substrate may also include a finishing layer deposited on said encapsulating layer. The disk substrate may be used in data storage and retrieval device.

The Disk Substrate

The disk substrate generally comprises an inner substrate and an encapsulating layer. Any number of composites may be used for the inner substrate in accordance with the invention which provide the required stiffness and hardness. Generally, the inner substrates of the invention may comprise any element, compound, or mixture thereof which provide a specific stiffness of at least 7.6 Mpsi/gm/cc.

In the fabrication of inner disks or substrates, generally, compositions which may be used include carbides, nitrates, oxides, and phosphides or mixtures thereof. Examples of materials which may be used as the inner substrate for a disk include metal matrix composites and aluminum-boron carbide composites.

Metal matrix composites are made by pigmenting a metal, such as aluminum, with a ceramic powder. The mixture is then melted and formed into a disk. The concentration of ceramic powder is balanced to provide optimal physical properties while also providing a disk which may be finished without surface defects.

Useful materials which may be fabricated into composites include those such as silicon carbide, sapphire, titanium nitride, boron carbide, boron nitrate, carbon, silicon nitride, as well as composites of glass and ceramic.

A representative list of compositions along with their relative specific stiffnesses (Mpsi/gm/cc) which may be used is found in Table 1 below.

TABLE 1

| Material | Specific Stiffness |
|---|---|
| Aluminum | 3.8 |
| Aluminosilicate glass | 4.9 |
| Lithium silicate glass | 5.2 |
| Carasite glass ceramic | 4.6 |
| Flint glass ceramic | 6.6 |
| Quartz glass | 4.9–6.1 |
| Titanium alloy | 3.3 |
| Zirconia | 5.1 |
| Alumina | 14.7 |
| Silicon carbide | 15.7–19.5 |
| Beryllium | 22.5 |
| Carbon | 2.2 |
| Alumina/aluminum composite | 5.3 |
| Boron carbide | 26.1 |
| Boron carbide/aluminum composite | 11.1–21.2 |

These materials may be used above or in combination to provide an inner disk substrate of the appropriate stiffness. Generally, the inner disk substrate has a stiffness of at least about 7.6 Mpsi/gm/cc, preferably from about 7.6 Mpsi/gm/cc to 30 Mpsi/gm/cc, more preferably from about 11 Mpsi/gm/cc to 22 Mpsi/gm/cc.

Other useful inner disk substrates include glass compositions, ceramics, and mixtures thereof. Glass is generally a silicate material having a structure of silicon and oxygen where the silicon atom is tetrahedrally coordinated to surrounding oxygen atoms. Any number of materials may be used to form glass such as boron oxide, silicon oxide, germanium oxide, aluminum oxide, phosphorous oxide, vanadium oxide, arsenic oxide, antimony oxide, zirconium oxide, titanium oxide, aluminum oxide, thorium oxide, beryllium oxide, cadmium oxide, scandium oxide, lanthanum oxide, yttrium oxide, tin oxide, gallium oxide, indium oxide, lead oxide, magnesium oxide, lithium oxide, zinc oxide, barium oxide, calcium oxide, strontium oxide, sodium oxide, cadmium oxide, potassium oxide, rubidium oxide, mercury oxide, and cesium oxide.

Glass/ceramic composites may also be used for the inner substrate. Glass/ceramics generally result from the melt formation of glass and ceramic materials by conventional glass manufacturing techniques. Subsequently, the materials are heat treated to transform them into fine-grain crystalline materials. Typical glass/ceramics are, for example. β-quartz solid solution, $SiO_2$; β-quartz; lithium metasilicate, $Li_2O$—$SiO_2$; lithium disilicate, $Li_2(SiO_2)_2$; β-spodumene solid solution; anatase, $TiO_2$; β-spodumene solid solution; rutile $TiO_2$; β-spodumene solid solution; mullite, $3Al_2O_3$—$2SiO_2$; β-spodumene dorierite, $2MgO$—$2Al_2O_3$—$5SiO_2$; spinel, $MgO$—$Al_2O_3$; MgO-stuffed; β-quartz; quartz; $SiO_2$; α-quartz solid solution, $SiO_2$; spinel, $MgO$—$Al_2O_3$; enstatite, $MgO$—$SiO_2$; fluorphlogopite solid solution, $KMg_3AlSi_3O_{10}F_2$; mullite, $3Al_2O_3$—$2SiO_2$; and, $(Ba, Sr, Pb)Nb_2O_6$.

Ceramics are generally comprised of aluminum oxides such as alumina, silicon oxides, zirconium oxides such as zirconia or mixtures thereof. Typical ceramic compositions include aluminum silicate; bismuth calcium strontium copper oxide; cordierite; feldspar, ferrite; lead acetate trihydrate; lead lanthanum zirconate titanate; lead magnesium nobate (PMN); lead zinc nobate (PZN); lead zirconate titanate; manganese ferrite; mullite; nickel ferrite; strontium hexaferrite; thallium calcium barium copper oxide; triaxial porcelain; yttrium barium copper oxide; yttrium iron oxide; yttrium garnet; and zinc ferrite.

Preferably, the inner substrate comprises an aluminum-boron carbide composite with a ratio of aluminum to boron carbide (Vol-%) ranging from about 1:99 to 40:60. The specific stiffness of these materials may range from about 11.1 to 21.2, preferably 15.2 to 21.2, and more preferably 15.2 to 17.0. Higher stiffnesses may result in disk brittleness while lower stiffness disks may suffer from vibration. These disks are commercially available from Dow Chemical Co. and are commonly referred to as boron carbide-aluminum composites or AlBC composites such as those disclosed in U.S. Pat. No. 4,702,770 which is incorporated herein by reference.

The disk substrate of the invention also comprises an encapsulating layer. The encapsulating layer functions to provide a polishable defect free surface. The encapsulating layer must also be adherent to the composite substrate and preferably wets to the substrate to be recoated.

Generally, any number of metals, or metal alloys, may be used to create the encapsulating layer. Representative compositions which may be used for the encapsulating layer include aluminum, magnesium, copper, and zinc, as well as alloys thereof. Aluminum is generally used as an encapsulating layer due to its easy processability and relative affordability.

The disk substrate may then be further processed and finished by any other means known to those of skill in the art.

Processing

Generally, the encapsulating layer may be applied to the inner disk substrate as a foil 13, 14 as can be seen in FIG.

1. Prior to application, the inner disk substrate may be cleaned with a source of acid or alkalinity to minimize or remove organics and oxides on the surface of the inner substrate. In processing, the inner disk substrate 10 is generally cleaned with acid to remove organic residues which may have become incident to the disk during fabrication. The disk may then be treated in baths of acid and/or base solutions to minimize oxide thickness.

Foils 13 and 14 are then positioned on the top and bottom side of the inner disk 10. Spacers 12 and 15 are then positioned between foils 13 and 14, and respective weight 11 and substrate 16. Weighs of 100 gm to 300 gm have been found useful in the process of the invention. Spacer thicknesses of about 50 mils have also been found useful in the process of the invention.

The layered structure shown in FIG. 1 is then assembled and placed into a reaction chamber. Preferably, the reaction chamber has an atmosphere which is inert and under partial vacuum or low pressure.

Substrate 16 and weight 11 may comprise stainless steel to allow for even heating cooling. Additionally, another set of spacers (not shown) may be placed between weight 11 and spacer 12 as well as between spacer 15 and substrate 16. This second set of spacers preferably comprises zirconium dioxide.

The assembly is then subjected to a multistep heating and cooling process. The assembly is first heated to a temperature of about 575° C.±50° C. to which in the presence of hydrogen reduces oxide formation in the chamber. The assembly may then be heated to just beyond the melting point of the metal foil, for example in the case of aluminum from about 670° C. to 700° C.

The assembly is heated in an inert reducing atmosphere to reduce the oxides present on all surfaces. Reducing the oxide content on the metallic foil surfaces allows the encapsulating layers 13 and 14 to wet out to the metal constituents in the inner disk substrate 10 so that an actual metal-metal bond is formed. Any hydrogen generating source may be used in the process. Alternatively, hydrogen may be used. The hydrogen atmosphere reduces a percentage of the oxides to their metallic precursors before the melting temperature of the metal is reached.

Preferably, each spacers also comprise a material which does not contribute to the formation of oxides on the surface of foils 13 and 14. Exemplary materials include boron nitride available from Advanced Ceramics Co. as its HBR or HBC products; and Z-Guard which is a mixture of zirconium dioxide and aluminum phosphate available from ZYP Coating Inc.

The atmosphere under low pressure or in the partial vacuum may range broadly depending upon the metal being used as a precursor for the encapsulating layer. Generally, those inert gases which may be used in accordance with the invention include neon, helium, nitrogen, argon, xenon, and mixtures thereof.

For example, the assembly may be heated to a temperature which allows reduction of oxides at low pressure from about 1 to 15 psi or in a partial vacuum of about less than 1 psi with an atmosphere of 4% hydrogen, 96% Argon at a temperature of about 575° C. The atmosphere is held at this temperature for a time ranging from about 0 to 2 hours, preferably about 0.25 to 2 hours, and more preferably about 0.5 hours.

The temperature is then raised allowing the foils to melt, forming a bond between the metal in the inner composite disk and the foil. Temperatures in excess of 660° C. or greater are not uncommon. The melting temperature is held for about 5 to 30 minutes, and preferably about ten minutes to allow liquefaction of the foil on the disk allowing the metals in both the inner disk substrate and foil to both bond. Generally, heating is completed at a temperature ranging from about 425° to 1200° C. depending upon the melting point of the material used for the encapsulating layer. The temperature in the partial vacuum or low pressure chamber needs to reach the melting point of the metal.

The system is then allowed to cool. Cooling is preferably done in a reducing environment to prevent the formation of metal oxides. The reducing gas is generally present in the chamber down to about 200° C. and an inert atmosphere is generally maintained in the vacuum chamber down to a temperature of about 125° C.

After application of the encapsulating layer, the disk substrate may be finished by means known to those of skill in the art. For example, any number of coatings may be used to plate or finish the substrate and, if desired, prepare it as a repository for data storage. Metallic nickel phosphorous is generally the standard in the industry for use as a finishing layer.

Electroless nickel coatings are generally produced by the controlled chemical reduction of nickel ions onto a catalytic surface. The deposit itself is auto catalytic to reduction and the reaction will continue as long as the surface remains in contact with the electroless nickel solution. Because the deposit is applied without an electric current, its thickness is uniform on all areas of an article in contact with fresh solution.

Electroless nickel solutions are blends of different chemicals, each performing an important function. Electroless nickel solution, typically contain a source of nickel, a reducing agent to supply electrons for the reduction of nickel, energy (in the form of heat), complexing agents (chelators) to control the free nickel available to the reaction, buffering agents to resist the pH changes caused by the hydrogen release during deposition, accelerators (exaltants) to help increase the speed of the reaction, inhibitors (stabilizers) to help control reduction, and reaction-by-products.

The characteristics of the electroless nickel bath and its deposit are determined by the formulation of these components.

Most hypophosphite reduced electroless nickel solutions now contain nickel sulfate as their source of nickel. Plating baths may be alkaline (operating at pH values greater than 8) and formulated with nickel chloride or nickel acetate. Acid baths often provide improved properties, and are composed of nickel sulfate. This salt is available commercially in a purer state than is nickel chloride, and sulfate baths are thought to produce better quality deposits than either chloride or acetate.

A reducing agent is the material which supplies the electrons needed to reduce ionic nickel to metallic nickel. When a salt, such as nickel sulfate, is dissolved in water, the cation (nickel) separates from the anion (sulfate) to form ionic nickel.

Chemical reduction is the lowering of the electrical charge of an ion. Because metals have no charge, the reducing agent in an electroless nickel solution must reduce the metal to a zero valence.

A number of different reducing agents have been used to formulate electroless nickel baths. Among these are sodium hypophosphite, amino-boranes, sodium borohydride, and hydrazine. These baths are described in the following paragraphs.

The majority of electroless nickel used commercially is deposited from solutions reduced with sodium hypophosphite. The principle advantages of these solutions over those reduced with boron compounds or hydrazide are lower cost, greater ease of control, and better corrosion resistance of the deposit.

The theory of action is thought to be that in the presence of a catalytic surface and sufficient energy, hypophosphite ions are oxidized to orthophosphite. A portion of the hydrogen given off is absorbed onto the catalytic surface. Nickel at the surface of the catalyst is then reduced by the absorbed, active hydrogen. Simultaneously, some of the absorbed hydrogen reduces a small amount of the hypophosphite at the catalytic surface to water, hydroxyl ion, and phosphorous. Most of the hypophosphite present is catalytically oxidized to orthophosphite and gaseous hydrogen independently of the deposition of nickel and phosphorous. This is the cause of the low efficiency of electroless nickel solutions. Typically, five times the weight of sodium hypophosphite is required to reduce on weight equivalent of nickel.

Generally, hypophosphite reduced electroless nickel plating solutions useful in the invention are those which contain nickel sulfate, sodium hypophosphite, and a nickel complexing agent.

The Data Storage Device

Figure 2:
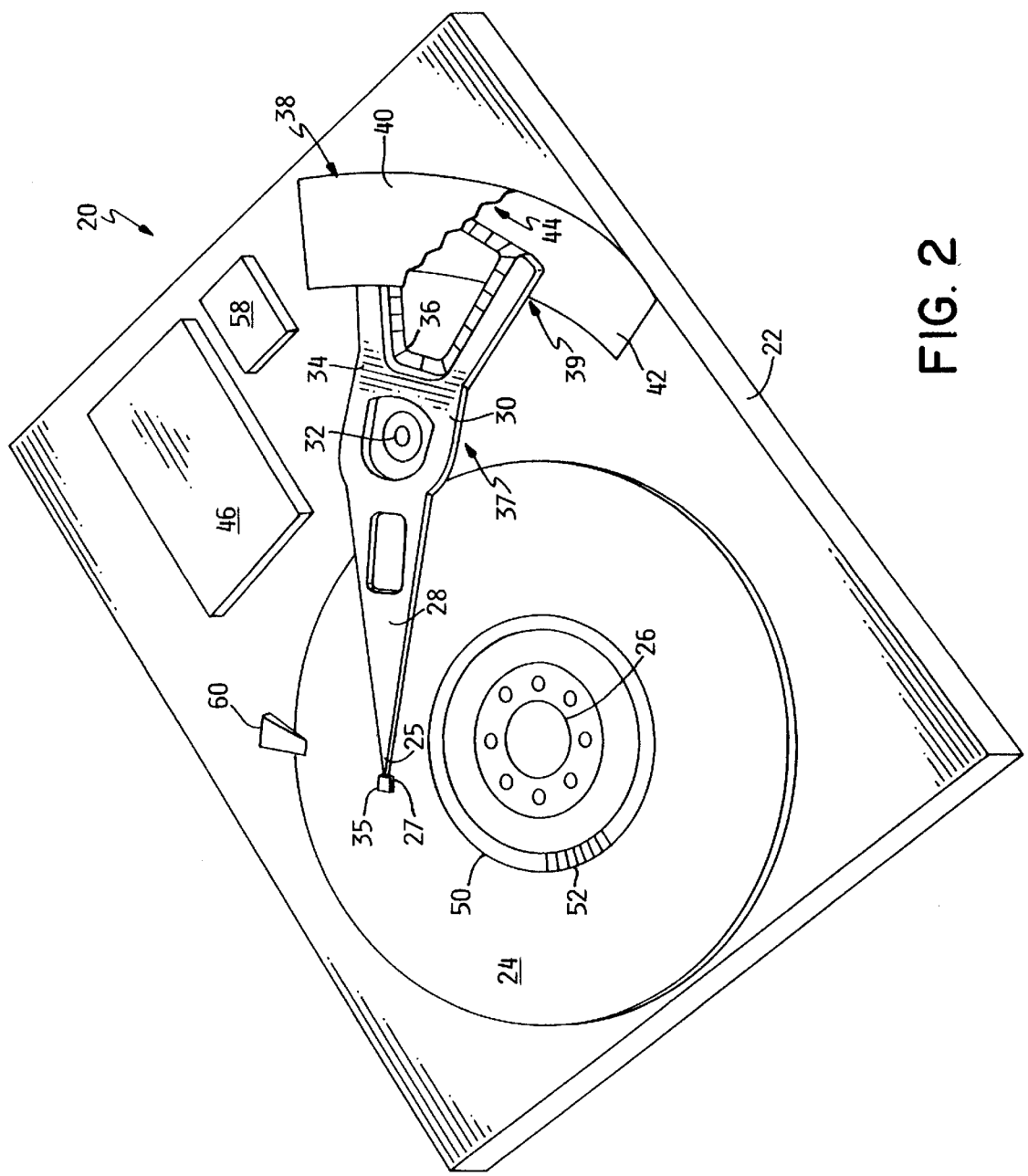
FIG. 2 is a perspective view of a data storage system with its upper housing cover removed.
Figure 3:
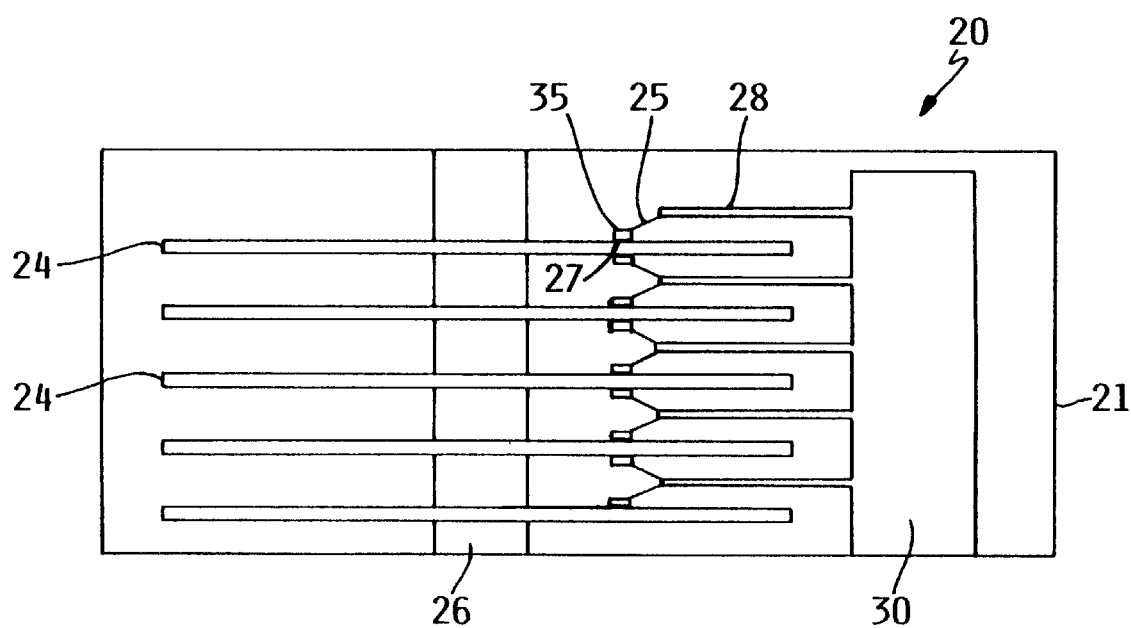
FIG. 3 is a side plan view of a data storage system comprising a plurality of data storage disks.

The invention also comprises a data storage or memory device. Referring now to the drawings, and more particularly to FIGS. 2 and 3, there is shown a data storage system 20 with the cover 23 removed from the base 22 of the housing 21. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiraled track configuration.

An actuator 30 typically includes a plurality of interleaved actuator arms 28, which Each arm having one or more transducers 27 and slider body 35 assemblies mounted to a load beam 25 for reading and writing information to and from the data storage disks 24. The slider body 35 is typically designed as an aerodynamic lifting body that lifts the transducer 27 off of the surface of the disk 24 as the rate of spindle motor 26 rotation increases, and causes the transducer 27 to hover above the disk 24 on an air bearing or airflow patterns produced by high-speed disk rotation. A conformal lubricant may alternatively be disposed on the disk surface 24 to reduce static and dynamic friction between the slider body 35 and disk surface 24.

A typical data storage system includes one or ore data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified (disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

WORKING EXAMPLE

The following example further illustrates, but does not limit, the invention.

Example 1

An Aluminum-Boron Carbide (AlBC) disk having a thickness of about 1 millimeter and a diameter of 95 millimeters as received from Dow Chemical with a final polish of BC or diamond was subjected to a series of treatments: first dipped in a 25% GMC 528-B (MDL Information System, Inc., San Leandro, Calif.) cleaner for 2 min., then rinsed in deionized water, next dipped in 25% nitric acid for 1 min., then rinsed in deionized water, and next dipped in 25% Alstan 40 (MDL Information System, Inc., San Leandro, Calif.) minus the iron component for 45 sec. The disk was then rinsed in deionized water, next dipped in 25% nitric acid for 5 seconds then rinsed in deionized water, next dipped ir, 25% GMC again for 2 min., then rinsed in deionized water, and finally dipped in IPA (isopropyl alcohol) and air dried.

The disk was then covered on both sides with 3 sheets of heavy duty aluminum foil. Each sheet of aluminum foil had a thickness of about 25 microns. On both sides of this structure a spacer disk was placed.

Spacer disks were made of zirconium oxide coated with Z-Guard (ZYP Coatings, Inc., Oak Ridge, Tenn.) which had been cured at 500° C. in air. Two more zirconium oxide disks were placed on the outside of the stack. The zirconium oxide disks each had a thickness of about 25 microns. The stack then had a 100 gm stainless steel plate set on top. The furnace was then purged of oxygen with 12 liters per min. of nitrogen and 1 liter per min. of 4% hydrogen 96% argon. The furnace was heated at 22° C. per min. to 200° C., 14° C. per min. to 408° C., 9° per min. to 544° C., 7° per min. to 648° C., and 5.8° per min. to 700° C. and held there for 10 min. Cooling was completed naturally. The gas flow remained on during heating and cooling with the hydrogen/argon shut off during cooling at 200° C. and the nitrogen at 125° C. This surface was polished with aluminum oxide slurry, cleaned, and given a standard electroless NiP plating treatment.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A disk substrate, said disk substrate comprising:
   (a) an inner composite substrate having a specific stiffness ranging from about 11 to about 22 Mpsi/gm/cc and comprising an aluminum/boron carbide composition substantially free of multiphase ceramic material, the aluminum/boron carbide composition having a ratio of aluminum to boron carbide (volume percentage) ranging from about 1:99 to about 40:60; and
   (b) a bonding layer deposited over each of a first surface and a second, surface of said inner substrate, said bonding layers adhering to said first and second inner substrate surfaces and providing polishable and substantially defect free surfaces.

2. The disk substrate of claim 1, wherein said inner substrate has a specific stiffness ranging from about 15 to about 22 Mpsi/gm/cc.

3. The disk substrate of claim 1, wherein each of said bonding layers has a thickness ranging from about 25 to about 75 microns.

4. The disk substrate of claim 1, wherein said inner substrate has a specific stiffness ranging from about 15 to about 17 Mpsi/gm/cc.

5. The disk substrate of claim 1, wnerein said disk substrate comprises a rigid disk for use in a data storage and retrieval device.

6. The disk substrate of claim 1, wherein each of said bonding layers comprises a material selected from the group consisting of aluminum, magnesium, copper, zinc, and mixtures thereof.

7. The disk substrate of claim 1, wherein said disk substrate additionally comprises a finishing layer deposited on each of said bonding layers.

8. The disk of claim 7, wherein each of said finishing layers comprises nickel or an alloy thereof.

9. The disk substrate of claim 1, wherein said aluminum/boron carbide composition comprises boron carbide and aluminum or an alloy of aluminum.

10. The disk substrate of claim 1, wherein said aluminum/boron carbide composition comprises principally boron carbide and aluminum metal or aluminum alloy substantially homogeneously distributed throughout said aluminum/boron carbide composition.

11. The disk substrate of claim 1, wherein said aluminum/boron carbide composition comprises about 10 to about 25 percent by volume of aluminum metal.

12. The disk substrate of claim 1, wherein said aluminum/boron carbide composition is substantially fully densified.

13. A data storage and retrieval device, said storage device comprising a disk substrate, said disk comprising:
   (a) an inner composite substrate having a stiffness ranging from about 11 to about 22 Mpsi/gm/cc, said inner substrate comprising an aluminum/boron carbide composition substantially free of multiphase ceramic material; and
   (b) a bonding layer deposited over each of a first surface and a second surface of said inner composite substrate, each of said bonding layers comprising a material selected from the group consisting of aluminum, magnesium, copper, zinc and mixtures thereof, said bonding layers adhering to said first and second inner substrate surfaces and providing polishable and substantially defect free surfaces.

14. The device of claim 13, wherein said inner substrate has a stiffness ranging from about 15 to about 22 Mpsi/gm/cc.

15. The device of claim 13, wherein said inner substrate comprises an aluminum/boron carbide composite.

16. The disk substrate of claim 15, wherein said aluminum/boron carbide composite comprises boron carbide and aluminum or an alloy of aluminum.

17. The disk substrate of claim 15, wherein said aluminum/boron carbide composite comprises principally boron carbide and aluminum metal or aluminum alloy substantially homogeneously distributed throughout said aluminum/boron carbide composite.

18. The disk substrate of claim 15, wherein said aluminum/boron carbide composite comprises about 10 to about 25 percent by volume of aluminum metal.

19. The disk substrate of claim 15, wherein said aluminum/boron carbide composite is substantially fully densified.

20. The device of claim 13, wherein said disk substrate additionally comprises a finishing layer deposited on each of said bonding layers.

21. The device of claim 20, wherein each of said finishing layers comprises nickel or an alloy thereof.

* * * * *